United States Patent [19]

Broske

[11] 3,872,707

[45] Mar. 25, 1975

[54] CRIMPED CONNECTION FOR FLARED END CONDUIT

[75] Inventor: William Franklin Broske, Camp Hill, Pa.

[73] Assignee: AMP Incorporated, Harrisburg, Pa.

[22] Filed: Oct. 5, 1973

[21] Appl. No.: 404,087

Related U.S. Application Data

[62] Division of Ser. No. 184,547, Sept. 28, 1971, abandoned.

[52] U.S. Cl............ 72/430, 29/237, 29/516, 29/520, 285/382.2
[51] Int. Cl............................. B21d 51/00
[58] Field of Search............ 72/430; 29/516, 421 E, 29/520, 237, 470.1; 285/382.2

[56] References Cited
UNITED STATES PATENTS

| 2,816,211 | 12/1957 | Hutchins | 285/382.2 |
| 2,957,236 | 10/1960 | Kreuchen | 29/470.1 |
| 3,334,510 | 8/1967 | Hallesy | 29/421 E |
| 3,675,949 | 7/1972 | Dawson | 285/382.2 |
| 3,759,551 | 9/1973 | Broske | 285/382.2 |
| R26,685 | 10/1969 | Broske | 29/421 |

Primary Examiner—C. W. Lanham
Assistant Examiner—Gene P. Crosby
Attorney, Agent, or Firm—Allan B. Osborne, Esq.

[57] ABSTRACT

A Crimping tool is disclosed having an explosive actuated tool arrangement for connecting lengths of conduit in end-to-end relationship to form a continuous length of conduit useful for conveying fluidic or gaseous media therethrough, or for providing an electrical conductor.

2 Claims, 3 Drawing Figures

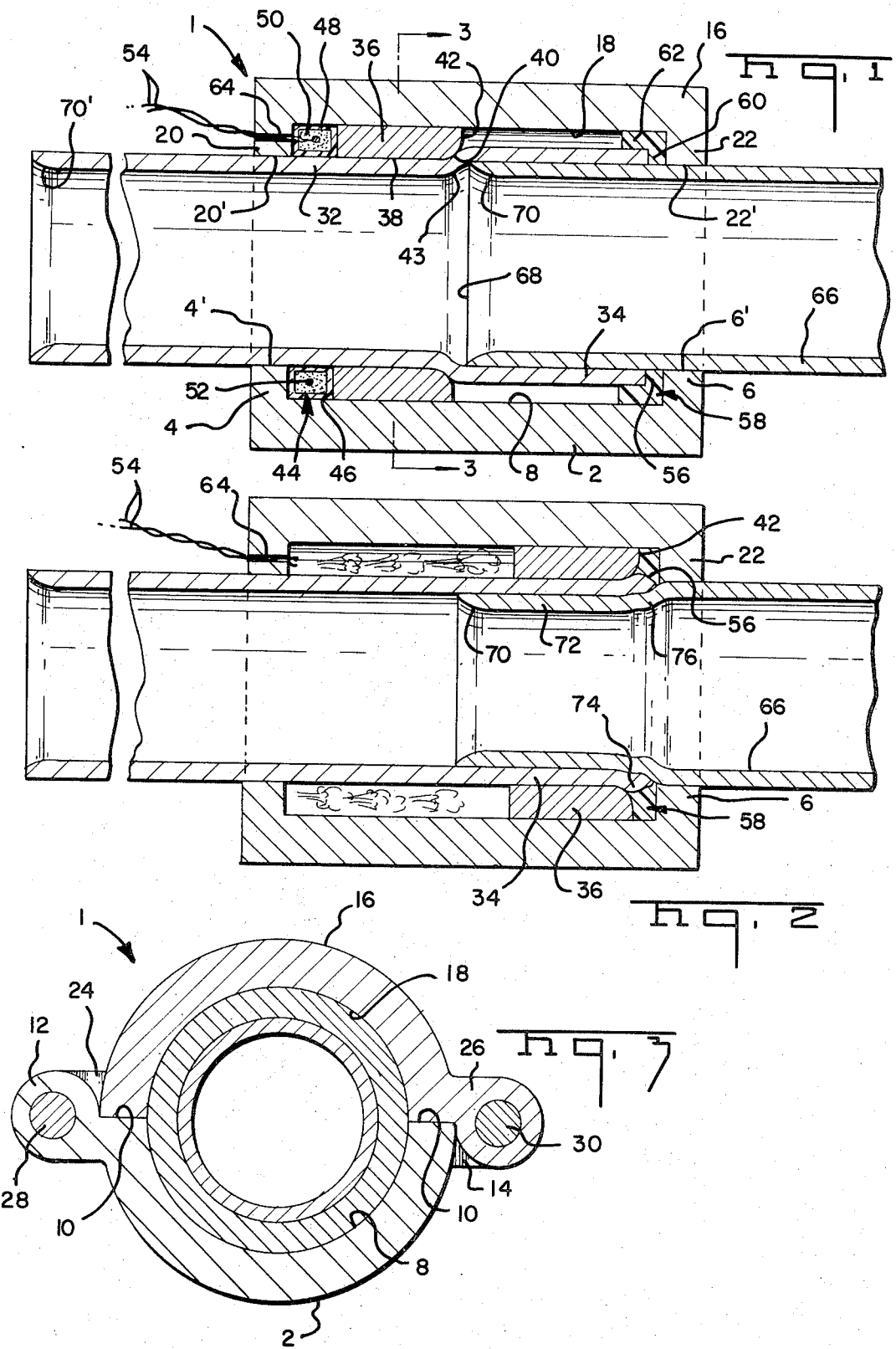

3,872,707

CRIMPED CONNECTION FOR FLARED END CONDUIT

This is a division, of application Ser. No. 184,547, filed Sept. 23, 1971, now abandoned.

The present invention relates to a method and apparatus for connecting a relatively short length of conduit to an end of a substantially continuous length of conduit. More particularly, the invention relates to a method for connecting relatively short lengths of conduit in end-to-end relationship to form a substantially continuous length of conduit useful for conveying fluidic or gaseous media therethrough, or for providing an electrical conductor of substantially tubular or hollow configuration as distinguished from a solid cylindrical conductor or stranded cable. The invention is particularly suited for joining together lengths of such electrically conducting or media-conveying conduit when it is desirable that the surfaces of the joined conduit lengths be relatively smooth and clean or otherwise free of burrs, nicks, abrasion marks and free of residues or contaminant material such as dust or other liquid or solid contaminants.

An object of the present invention is to provide a method and apparatus for connecting a relatively short length of conduit to an end of a substantially continuous length of conduit as well as for connecting relatively short lengths of conduit in end-to-end relationship to form a substantially continuous length of conduit without a need for welding, brazing or the use of adhesives.

Another object of the present invention relates to method and apparatus for connecting a length of conduit to another length of conduit to provide a conduit connection suitable for conducting electricity or for transmitting media therethrough without abrasion or otherwise deformation of the surfaces of the conduit and without depositing impurities or contaminant residues on the surfaces of the conduit connection.

Another object of the present invention is to provide a method and apparatus for connecting a length of conduit in end-to-end relationship with another length of conduit by the use of a tool having both reusable and purposely expendable parts.

Another object of the present invention is to provide a method and apparatus for joining a length of conduit in end-to-end relationship with another length of conduit to form a continuous length of conduit suitable for conducting electricity or for conveying fluid media by utilizing cold welding joining techniques.

Another object of the present invention is to provide a method and apparatus for connecting a length of conduit in end-to-end relationship with another length of conduit in fabricating a continuous length of conduit suitable for conducting electrical energy or for conveying fluidic media therethrough utilizing cold welding joining techniques and actuation of an explosive operated tool having both expendable and reusable parts, and without leaving residues of contaminants on the surfaces of the conduit lengths.

Other objects and many attendant advantages of the present invention will become apparent upon perusal of the following detailed description taken in conjunction with the accompanying drawings, wherein:

FIG. 1 is a fragmentary elevation in section of a relatively short length of conduit having its end portion radially outwardly flared to a larger diameter and received over an end portion of another relatively short length of conduit, together with apparatus according to the present invention in the form of an explosive operated tool having both expendable and reusable parts;

FIG. 2 is a fragmentary elevation in section illustrating operation of the tool as shown in FIG. 1, and further illustrating a completed connection of the relatively short lengths of conduit prior to removal of the tool from the completed connection; and FIG. 3 is a section taken generally along the line 3—3 of FIG. 1.

With more particular reference to the drawings, there is shown in FIG. 1 generally at 1 a preferred embodiment of a tool according to the present invention. In practice, the tool is similar to the tool as described in U.S. Pat. application Ser. No. 691,307, filed Dec. 18, 1967, now abandoned, the subject matter of which application is specifically incorporated by reference herein. Accordingly, with reference to FIGS. 1 and 3, the tool comprises a first elongated semi-cylindrical portion 2 having endwalls 4 and 6 and a semi-cylindrical inner sidewall 8. The semi-cylindrical portion 2 includes a parting line 10 which gives it a semi-cylindrical configuration. Along the parting line 10 integral with the semi-cylindrical portion 2 are provided a plurality of longitudinally spaced aligned tubular members, one of which is shown at 12. Along the parting line 10 radially opposed from the tubular portions 12 are provided a plurality of spaced tubular portions integral with the semi-cylindrical portion 2, one of which portions is partially shown at 14. The explosive actuated tool is further provided with a second elongated semi-cylindrical portion 16 having an inner semi-cylindrical sidewall 18 terminating in endwalls 20 and 22. As shown in FIG. 3, the semi-cylindrical portion 16 is mated with the semi-cylindrical portion 2 along the parting line 10. The inner sidewalls 8 and 18 have the same radius of curvature and cooperate to form a generally elongated cylindrical housing or chamber terminating at one end by the radially aligned walls 4 and 20, and terminating at another end by the radially aligned walls 6 and 22.

As shown in FIG. 3, the cylindrical portion 16 includes a plurality of longitudinally spaced aligned tubular portions adjacent to the parting line 10. A portion of one of the tubular portions is indicated at 24. The tubular portions 12 and 24 are in longitudinal alignment, with a tubular portion 24 interposed between spaced pairs of tubular portions 12. The aligned tubular portins 12 and 24 receive therethrough a common pin 28 providing a pivot pin about which the cylindrical portions 2 and 16 may be pivoted to substantially expose the interior sidewalls 8 and 18. In similar fashion, the semi-cylindrical portion 16 is provided with integral longitudinally spaced and aligned tubular portions 26 adjacent the parting line 10. The tubular portions 26 are in alignment with the tubular portions 14 to receive therethrough a removable pin 30. The tubular portions 26 and 14 are spaced along the parting line 10 such that a tubular portion 14 is interposed and in alignment between spaced pairs of the tubular portions 26. The completed tool thus forms a chamber block as shown in FIG. 1 of the drawings and further is consistent with the disclosure of the cross referenced application. As shown in FIG. 1, the radially directed endwall 4 is provided with a semi-cylindrical recess 4' which cooperates with a semi-cylindrical recess 20' provided in the endwall 20 to form a cylindrical opening into the chamber block. In similar fashion, the radially directed endwall 6 is provided with a semi-cylindrical recess 6' which cooperates with a semi-cylindrical recess 22' provided in the radially directed endwall 22 to form a circular opening through the chamber block having the same diameter and in alignment with the opening formed by the cooperating recesses 4' and 20'. As shown in FIG. 1, a relatively short length of tubular metal conduit 32 is first provided with an outwardly flared enlarged cylindrical portion 34. The length of conduit 32 is further provided thereover with an encircling annular die 36 having an inner diameter 38 slidably received over the outer diameter of the length of conduit 32. The die 36 includes a convexly flared leading edge 40 contiguous with the inner diameter 38 and the terminal end 42 of the die 36. The lead-in surface 40 is received in abutting relationship against the transistion between the outer diameter of the length of conduit 32 and the enlarged outer diameter of the portion 34 of the length of conduit 32. Additionally, the length of conduit 32 is provided thereover with an encircling generally annular propellant charge or cartridge 44 in abutting relationship against the terminal end 46 of the die 36. The cartridge 44 includes an outer generally annular casing 48 containing a quantity of a suitable propellant which is capable of detonation. Typically, the propellant 50 surrounds a heater wire 52 operatively connected to a pair of insulation-covered electrical leads 54.

Yet with reference to FIG. 1, the terminal cylindrical and 56 of the enlarged cylindrical portion 34 is provided thereover with an annular cap 58 of a malleable material such as plastic or a malleable metal. The cap has a generally circular portion 60 overlying the end portion 56 and a relatively short cylindrical portion 62 which is integral with the portion 60 and overlies a portion of the outer cylindrical surface of the enlarged diameter portion 34 of the conduit length 32.

As shown in FIG. 1, the conduit 32, together with the cartidge 44, the die 36 and the end cap 58 are placed in the semi-cylindrical portion 2 of the explosive actuated tool 1. The semi-cylindrical portion 16 is then pivoted about the pin 28 to overlie the semi-cylindrical portion 2, thereby containing the assembled component parts as described above internally of the tool 1. The pin 30 is then inserted through the aligned tubular portions 26 and 14 to prevent separation of the matingly cooperating semi-cylindrical portions 2 and 16. With the portions 2 and 16 in such mating cooperation, a chamber block is formed. The malleable cap 58 is received agaist the endwalls 6 and 22, the terminal end 56 of the enlarged diameter portion 34 of the conduit length is received in registration against the cap 58, the die lead-in surface 40 is received against the transition of the conduit length 32 as described, and the generally annular cartridge 44 is in registration between the terminal end 46 of the die and the endwalls 4 and 20 of the chamber block of the tool 1. As shown in FIG. 1, the lead wires 54 of the cartridge 44 are received through a reduced diameter vent 64 provided in the endwall 20. The tool 1 is thereby fixedly retained in position over the enlarged diameter end portion 34 of the relatively short length of conduit 32. To complete a desired connection of conduit lengths in end-to-end relationship, an operator positions the assembled tool and conduit enlarged diameter portion 34 over an end portion of another relatively short length of conduit 66. In practice, the conduit end portion 66 may be the end portion of a substantially continuous length of conduit fabricated from conduit lengths joined generally in end-to-end relationship. The conduit end portion 66 is received through the opening provided by the cooperating recesses 6' and 22'. The terminal end 68 of the conduit end portion 66 is received against the transition 43 between the enlarged portion 34 and the remaining portion of the length of conduit 32 forming an area of juncture. As shown, the inner diameter of the conduit end portion 66 may be provided with a flared end surface 70. Thus with the parts in such registration as described above, an operator will realize that the tool and conduit lengths are in a desired position to effect a connection between the conduit lengths.

Thus with reference to FIG. 2, an electrical charge is applied across the insulated wires 54, causing the heater wires 52 to increase in temperature. The propellant 50 will thereby be detonated forcibly propelling the generally annular die 36 to traverse longitudinally over the enlarged portion 34 of the conduit length 32. The chamber block sidewalls 8 and 18 prevent radially outward expansion of the dies. Accordingly, as the die 36 traverses longitudinally in encircling relationship over the enlarged diameter portion 34, it will radially compress the enlarged diameter portion 34 to assume a smaller diameter to allow passage thereover of the longitudinally propelled die 36. As shown in FIG. 2, the die 36 will forcibly impact against the malleable material 58, thereby compressing and compacting it against the endwalls 6 and 22. In addition, the dies radially compress the end portion 66 which is received internally of the enlarged diameter portion 34 of the conduit length 32. As shown in FIG. 2, such portion is radially compressed into a reduced diameter cylindrical portion 72 of substantially smaller diameter than the original diameter of the conduit end portion 66. In addition, the portion 72 resists radial compression caused by the die 36, thereby causing the initially enlarged diameter portion 34 to be compressed between the die 36 and the portion 72. Such radial compression thereby causes some longitudinal extrusion of the initially enlarged diameter portion 34. Such extrusion occurs longitudinally of the conduit length 32 and generally adjacent to the lead-in surface 40 of the die 36. The longitudinal extrusion accordingly causes considerable scouring between the outer diameter surface of the conduit portion 66 and the inner diameter surface of the conduit portion 34. Such scouring action takes place over a relatively short period of time as the die 36 is impulse-propelled upon detonation of the charge 44. Accordingly, cold welds are formed between the conduit portions 34 and 72 since the scouring effect occurs over a relatively short span of time. In additon, the impule displacement of the dies occurs over a considerable cylindrical length causing such scouring to occur over a considerable area. The displacement of the piston 36 is abruptly terminated upon impact with the malleable material 58 thereby resulting in a cold-formed cylindrical bead 74 formed as a result of longitudinal extrusion of the conduit portion 34 adjacent to the lead-in surface 40 of the die 36. Also as shown in FIG. 2, the terminal end 42 of the die considerably deforms the malleable material 58 from its original generally L-shaped cross section as shown in FIG. 1. More particularly, the malleable material is compacted against the endwall 6 and 22 causing considerable radial compression on the terminal end 56 of the conduit length 32. Thus compaction of the malleable material 58 is forced radially in compression against the terminal end 56 giving it a generally tapered configuration as shown in FIG. 2 which is more desirable than the abrupt annular surface as shown in FIG. 1, thereby eliminating all sharp external edges on the completed connection. As a further proof of longitudinal extrusion of the conduit portion 34, the narrow tapered surface 56 terminates immediately adjacent to the end walls 6 and 22 of the tool 1, whereas initially as shown in FIG. 1, the surface 56 was in substantially spaced relationship from the endwalls 6 and 22 and separated therefrom by the portion 60 of the malleable material 58. As an addition feature the transition 76 between the conduit portions 66 and 72 is gradually tapered to avoid an abrupt transition of internal dimensions within the conduit length 66. Ordinarily, the transition 76 would be rather abrupt as caused by the concentration of compression forces forming the tapered surface 56. However, such concentration of compression forces is greatly alleviated by allowing formation of the bead 74 in a space between the malleable material 58 and the die lead-in surface 40. The formation of the bead 74 thus stress-relieves the radial compression forces which are ordinarily required to form the tapered surface 56. In such manner, the transition 76 is formed with a gradual taper rather than an abrupt one. In practice, the conduit length 32 may have its end portion 70' provided with a flared internal surface similar in configuration to the surface 70 of the conduit end portion 66. Accordingly, the process as described may be repeated utilizing another relatively short length of conduit similar in configuration to the conduit length 32 thereby joining such similar length of conduit over the end portion of conduit 32 which has the flared internal surface 70'. As the internal pressures due to detonation subside, the residual gas pressures are slowly vented through the vent 64, so that separation of the tool from the completed connection may be accomplished without sudden gaseous discharge. The completed connection is relatively free of sharp edges. The internal surfaces of the conduit are substantially free of scrapes, nicks and other deformations. The required radial compression to smaller diameters in order to produce the required cold welding produces only gradual transitions, thereby enabling efficient conveying of fluid products through the generally end-to-end joined conduit lengths.

Although preferred embodiments of the present invention have been described and shown in detail, other modifications and embodiments thereof which would be obvious to an artisan are intended to be covered in the spirit and scope of the appended claims, wherein:

What is claimed is:

1. A subassembly for crimping a first conduit having a flared end portion onto a second conduit partially inserted into the flared end portion of the first conduit, which comprises;
    a. a chamber having first and second ends adapted to fit over the area of insertion between the first and second conduits;
    b. a die reciprocally mounted in and confined by the chamber, said die encircling the first conduit adjacent its flared end portion;
    c. propellant means for driving the die longitudinally over the flared end portion and compressing said portion radially inwardly, said propellant means positioned between the die and the first end of said chambers;
    d. detonating means for detonating the propellant means; and
    e. a malleable, annular cap positioned on the second conduit between the flared end portion of the first conduit and the second end of the chamber, said cap capable of being radially deformable by said die upon detonation of the propellant means.

2. The subassembly of claim 1 wherein said die includes an inner leading surface convexly shaped so that said die may form a cold cylindrical bead on said flared end portion upon detonation of said propellant means.

* * * * *